(12) United States Patent
Maltz et al.

(10) Patent No.: US 10,264,250 B2
(45) Date of Patent: Apr. 16, 2019

(54) METHOD AND APPARATUS FOR DETERMINING SPECTRAL CHARACTERISTICS OF AN IMAGE CAPTURED BY A CAMERA ON A MOBILE ENDPOINT DEVICE

(71) Applicant: The Procter & Gamble Company, Cincinnati, OH (US)

(72) Inventors: Martin Sidney Maltz, Rochester, NY (US); Raja Bala, Pittsford, NY (US); Paul Jonathan Matts, Surrey (GB); Ankur Purwar, Sunglade (SG)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 15/414,147

(22) Filed: Jan. 24, 2017

(65) Prior Publication Data

US 2017/0272741 A1 Sep. 21, 2017

Related U.S. Application Data

(60) Provisional application No. 62/311,131, filed on Mar. 21, 2016.

(51) Int. Cl.
*H04N 7/18* (2006.01)
*H04N 9/47* (2006.01)
(Continued)

(52) U.S. Cl.
CPC ......... *H04N 17/002* (2013.01); *G06K 7/1417* (2013.01); *G06Q 30/0207* (2013.01); *A45D 2044/007* (2013.01)

(58) Field of Classification Search
CPC .......... G06K 19/06037; G06K 7/1417; G06Q 30/0207; G06T 2207/30088;
(Continued)

(56) References Cited

U.S. PATENT DOCUMENTS 5,983,120 A 11/1999 Groner et al.
8,077,931 B1 12/2011 Chatman
(Continued)

OTHER PUBLICATIONS

All Office Actions, U.S. Appl. No. 15/414,002.
(Continued)

*Primary Examiner* — Jessica M Prince
(74) *Attorney, Agent, or Firm* — John G. Powell

(57) ABSTRACT

A method, non-transitory computer readable medium and apparatus for determining spectral characteristics of an image captured by a camera on a mobile endpoint device are disclosed. For example, the method includes receiving the image of a color calibration card comprising a plurality of color patches and a quick response (QR) code, wherein each one of the plurality of color patches has a known spectral reflectance, determining spectral characteristics from the image of the color calibration card, wherein the spectral characteristics are used to analyze additional images that are received from the camera on the mobile endpoint device and transmitting an activation signal to activate an incentive associated with the QR code to the mobile endpoint device in response to receiving the image of the color calibration card.

17 Claims, 5 Drawing Sheets

(51) Int. Cl.
*H04N 17/00* (2006.01)
*G06K 7/14* (2006.01)
*G06Q 30/02* (2012.01)
*A45D 44/00* (2006.01)

(58) Field of Classification Search
CPC ......... G06T 2207/30201; G06T 7/0012; G06T 7/90; H04N 17/002
See application file for complete search history.

(56) References Cited

U.S. PATENT DOCUMENTS

| | | | |
|---|---|---|---|
| 2007/0071314 A1 | 3/2007 | Bhatti | |
| 2007/0104472 A1* | 5/2007 | Quan | G03B 7/08 396/79 |
| 2008/0080746 A1 | 4/2008 | Payonk | |
| 2008/0194928 A1 | 8/2008 | Bandic | |
| 2009/0245603 A1 | 10/2009 | Koruga | |
| 2010/0172567 A1 | 7/2010 | Prokoski | |
| 2011/0016001 A1 | 1/2011 | Schieffelin | |
| 2011/0196616 A1 | 8/2011 | Gunn | |
| 2012/0223131 A1* | 9/2012 | Lim | G06Q 30/02 235/375 |
| 2013/0041733 A1* | 2/2013 | Officer | G06Q 30/02 705/14.16 |
| 2013/0079620 A1 | 3/2013 | Kuth et al. | |
| 2013/0094780 A1 | 4/2013 | Tang et al. | |
| 2013/0158968 A1 | 6/2013 | Ash et al. | |
| 2014/0089017 A1 | 3/2014 | Klappert et al. | |
| 2014/0201126 A1 | 7/2014 | Zadeh | |
| 2014/0209682 A1* | 7/2014 | Gottwals | G06K 7/10544 235/454 |
| 2014/0211022 A1* | 7/2014 | Koh | H04N 17/002 348/188 |
| 2014/0219526 A1 | 8/2014 | Linguraru et al. | |
| 2014/0270490 A1 | 9/2014 | Wus et al. | |
| 2014/0334723 A1* | 11/2014 | Chatow | G06K 19/0614 382/165 |
| 2015/0045631 A1* | 2/2015 | Ademola | A61B 5/6898 600/301 |
| 2016/0162728 A1* | 6/2016 | Arai | A61B 5/743 382/118 |
| 2017/0246473 A1 | 8/2017 | Marinkovich | |
| 2017/0270348 A1 | 9/2017 | Morgana et al. | |
| 2017/0270349 A1 | 9/2017 | Polania Cabrera et al. | |
| 2017/0270350 A1 | 9/2017 | Maltz et al. | |
| 2017/0270691 A1 | 9/2017 | Maltz et al. | |

OTHER PUBLICATIONS

All Office Actions, U.S. Appl. No. 15/414,095.
All Office Actions, U.S. Appl. No. 15/414,189.
All Office Actions, U.S. Appl. No. 15/414,305.
Finlayson et al., Color by Correlation: A Simple, Unifying Framework for Color Constancy, IEEE Transactions on Pattern Analysis and Machine Intelligence, vol. 23, No. 11, Nov. 2001, pp. 1209-1221.
Gong et al., Quantification of Pigmentation in Human Skin Images, IEEE, 2012, pp. 2853-2856.
Hyvarinen et al., A Fast Fixed-Point Algorithm for Independent Component Analysis of Complex Valued Signals, Neural Networks Research Centre, Helsinki University of Technology, Jan. 2000, 15 pages.
Hyvarinen et al., A Fast Fixed-Point Algorithm for Independent Component Analysis, Neural Computation, 9:1483-1492, 1997.
Ojima et al., Application of Image-Based Skin Chromophore Analysis to Cosmetics, Journal of Imaging Science and Technology, vol. 48, No. 3, May 2004, pp. 222-226.
Sun et al., Statistical Characterization of Face Spectral Reflectances and Its Application to Human Portraiture Spectral Estimation, Journal of Imaging Science and Technology, vol. 46, No. 6, 2002, pp. 498-506.
Tsumura et al., Image-based skin color and texture analysis/synthesis by extracting hemoglobin and melanin information in the skin, ACM Transactions on Graphics (TOG), vol. 22, Issue 3, Jul. 2003, pp. 770-779.

\* cited by examiner

US 10,264,250 B2

METHOD AND APPARATUS FOR DETERMINING SPECTRAL CHARACTERISTICS OF AN IMAGE CAPTURED BY A CAMERA ON A MOBILE ENDPOINT DEVICE

CROSS REFERENCE TO RELATED APPLICATIONS

This application claims priority under 35 U.S.C. § 119(e) to U.S. provisional patent application Ser. No. 62/311,131, filed on Mar. 21, 2016, which is hereby incorporated by reference in its entirety.

The present disclosure relates generally to cameras on mobile endpoint devices used for capture of selfie images for facial skin analysis and, more particularly, to a method and apparatus for determining spectral characteristics of an image captured by a camera on a mobile endpoint device.

BACKGROUND

Some companies are beginning to develop products or applications to improve a consumer's skincare experience. The applications look to provide product recommendations and navigation solutions. The applications can also provide personalized skincare for the customer by providing continuous support, educating the user about skin biology, tracking the customer's skin performance over time, and customizing product and regiment solutions to the customer's individual needs.

One challenge to providing such applications is an ability to receive an accurate image of the customer's face and providing an accurate analysis of the customer's face based on the image. Some solutions may require the customer to come to a lab or a studio of the company to take images with high quality cameras in a controlled light setting. However, requiring the customer to travel to another lab or studio is time consuming and inconvenient to the customer.

Another option may be to analyze images provided by the customer. However, images provided by the customer can have a large amount of variation in image quality and lighting.

SUMMARY

According to aspects illustrated herein, there are provided a method, non-transitory computer readable medium and apparatus for determining spectral characteristics of an image captured by a camera on a mobile endpoint device. One disclosed feature of the embodiments is a method that receives the image of a color calibration card comprising a plurality of color patches and a quick response (QR) code, wherein each one of the plurality of color patches has a known spectral reflectance, determines spectral characteristics from the image of the color calibration card, wherein the spectral characteristics are used to analyze additional images that are received from the camera on the mobile endpoint device and transmits an activation signal to activate an incentive associated with the QR code to the mobile endpoint device in response to receiving the image of the color calibration card.

Another disclosed feature of the embodiments is a non-transitory computer-readable medium having stored thereon a plurality of instructions, the plurality of instructions including instructions which, when executed by a processor, cause the processor to perform operations that receive the image of a color calibration card comprising a plurality of color patches and a quick response (QR) code, wherein each one of the plurality of color patches has a known spectral reflectance, determine spectral characteristics from the image of the color calibration card, wherein the spectral characteristics are used to analyze additional images that are received from the camera on the mobile endpoint device and transmit an activation signal to activate an incentive associated with the QR code to the mobile endpoint device in response to receiving the image of the color calibration card.

Another disclosed feature of the embodiments is an apparatus comprising a color calibration card for calibrating color of a camera on a mobile endpoint device. In one embodiment, the color calibration card comprises a plurality of color patches, wherein each one of the plurality of color patches has a known spectral reflectance, a quick response code comprising a link to an incentive that is activated after an image of the color calibration card is received by a facial skin analysis server and one or more alignment marks.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a method and apparatus for determining spectral characteristics of an image captured by a camera on a mobile endpoint device. The spectral characteristics can be applied to subsequent selfie images for accurate analysis of the selfie images for facial skin health, as discussed below. As discussed above, some companies are beginning to develop products or applications to improve a consumer's skincare experience. In doing so, an image of the customer can be used to analyze the health of the customer's skin. The image of the customer's skin can be analyzed and feedback of the analysis can be provided back to the user as an assessment of facial skin health.

One challenge to providing such applications is an ability to receive an accurate image of the customer's face and providing an accurate analysis of the customer's face based on the image. Images captured with a user's mobile endpoint device (e.g., a cell phone or a smart phone) may have a large amount of variation between endpoint devices. In addition, users take pictures in a variety of different environments having different lighting. In other words, users typically do not capture images of themselves in the same environment using the same lighting. As a result, accurately analyzing images of different customers can be challenging.

One way to account for the various different environments and lighting used by different customers may be to capture color calibration images of the camera on the mobile endpoint device being used. The image of the color calibration images may be used to identify the illumination, camera sensitivities of the red, green, blue (RGB) sensors of the camera, and the image processing of the camera of the mobile endpoint device.

However, customers may be unreliable in consistently taking a color calibration image before taking a selfie image. Thus, in one embodiment of the present disclosure, a color calibration card may be deployed that includes a quick response (QR) code with links to incentives for the customer. As a result, the customer may be motivated to take the color calibration image of the color calibration card to take advantage of the incentives.

In addition, the color calibration card may be customized for a mobile skin care application. For example, currently used color calibration cards may have a general array of primary colors having large wavelength differences. However, embodiments of the present disclosure may add color patches that are similar to skin colors to help fine tune the color calibration for facial skin analysis of the images. In other words, the color calibration cards may have a first set of color patches for an initial overall calibration and a second set of color patches for fine tuning the color calibration for skin colors.

Figure 1:
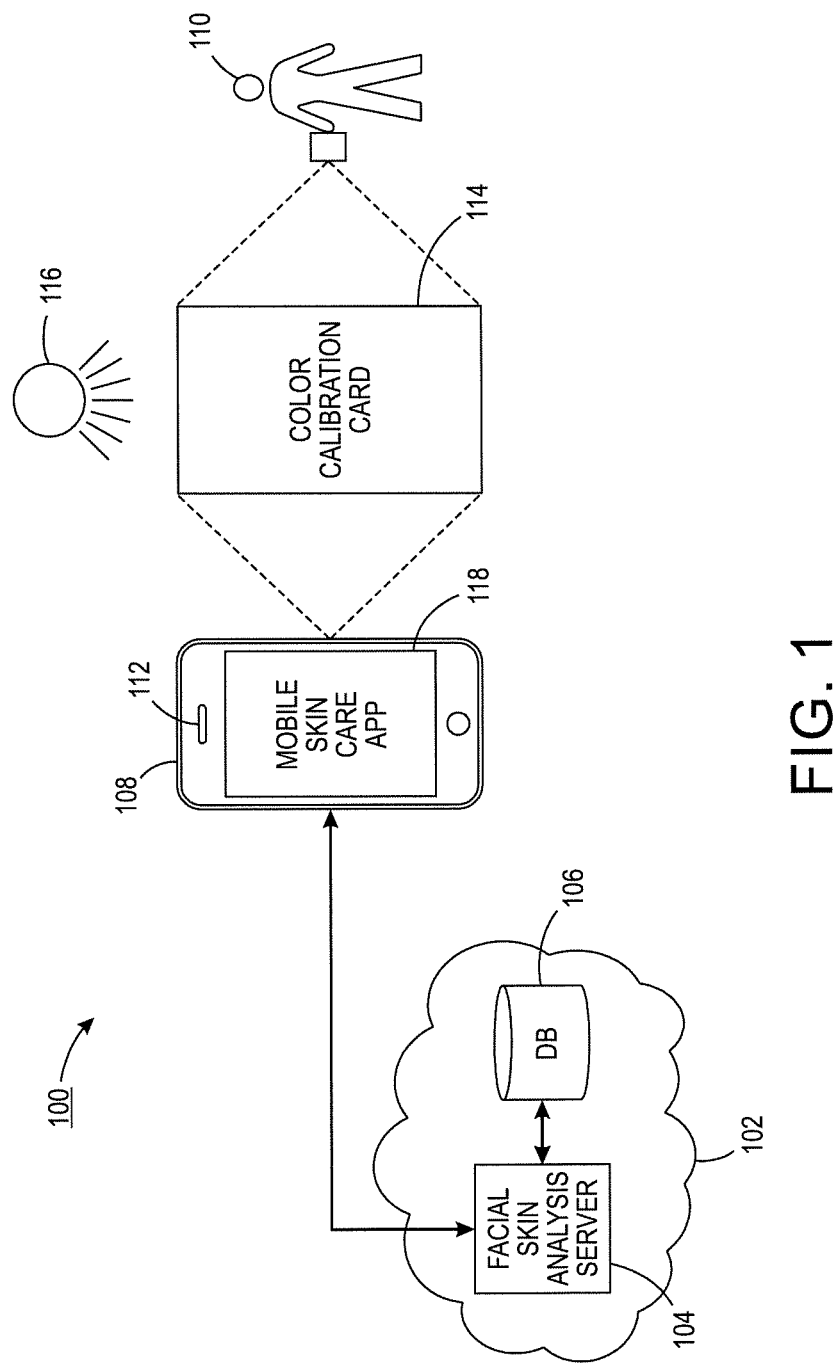
FIG. 1 illustrates an example block diagram of a communication network of the present disclosure.

FIG. 1 illustrates an example system 100 of the present disclosure. In one embodiment, the system 100 may include a communication network 102. The communication network 102 may be any type of wired or wireless communication network. In one embodiment, the communication network 102 may be an Internet Protocol (IP) network.

It should be noted that the communication network 102 has been simplified for ease of explanation. For example, the communication network 102 may include one or more additional network elements (e.g., a router, a gateway, a border element, switches, and the like) or access networks (e.g., a cellular access network, a broadband access network, and the like) that are not shown.

In one embodiment, the communication network 102 may include a facial skin analysis server (FSAS) 104 and a database (DB) 106. In one embodiment, the FSAS 104 may establish a wired or wireless connection with one or more mobile endpoint devices 108 to receive and transmit images to the one or more mobile endpoint devices 108 and perform the functions described herein.

In one embodiment, the DB 106 may store various information associated with the functions described herein. For example, the DB 106 may store images of a color calibration card 114 used to determine spectral characteristics, the spectral characteristics that are determined (e.g., an illuminant 116 that is used, a camera spectral sensitivity, and the like), functions used to determine the spectral characteristics, one or more selfie images received from the one or more endpoint devices 108 of one or more customers 110 (also referred to herein generically as "a user" or "users"), generated graphical chromophore maps, an assessment of facial skin health generated by the FSAS 104, and the like.

It should be noted that although FIG. 1 illustrates a single mobile endpoint device 108, a single customer 110, a single FSAS 104, and a single DB 106, that any number of mobile endpoint devices, customers, FSAS and DBs may be deployed. For example, multiple FSASs 104 may be deployed to perform a distributed processing of the selfie images. In another example, a plurality of mobile endpoint devices 108 may be sending images of different customers 110 to be analyzed and processed for each customer 110.

In one embodiment, the mobile endpoint device 108 may include a camera 112 and mobile skin care application 118. The mobile skin care application 118 may be used to help provide a customized skincare experience for the customer 110.

However, as discussed above, the mobile skin care application 118 uses selfie images of the customer 110 that are captured by the camera 112 of the mobile endpoint device 108. In addition, the selfie images are captured using a variety of different illuminants 116. For example, the different types of illuminants 116 can include incandescent lighting, fluorescent lighting, sunlight, halogen lighting, and the like. The illuminant 116 that is used can affect the image quality and color of the selfie image making accurate analysis of the selfie image difficult for the FSAS 104.

In one embodiment, the mobile skin care application 118 may prompt, or require, the customer 110 to capture an image of the color calibration card 114 before taking the selfie image. The image of the color calibration card 114 may be used by the FSAS 104 to determine the illuminant 116 that is being used to capture selfie images and spectral characteristics of the image of the color calibration card 114. The known illuminant 116 and the spectral characteristics may be applied to the subsequently received selfie images to allow the FSAS 104 to perform an accurate analysis on the skin health of the customer 110 based on the selfie image.

Figure 2:
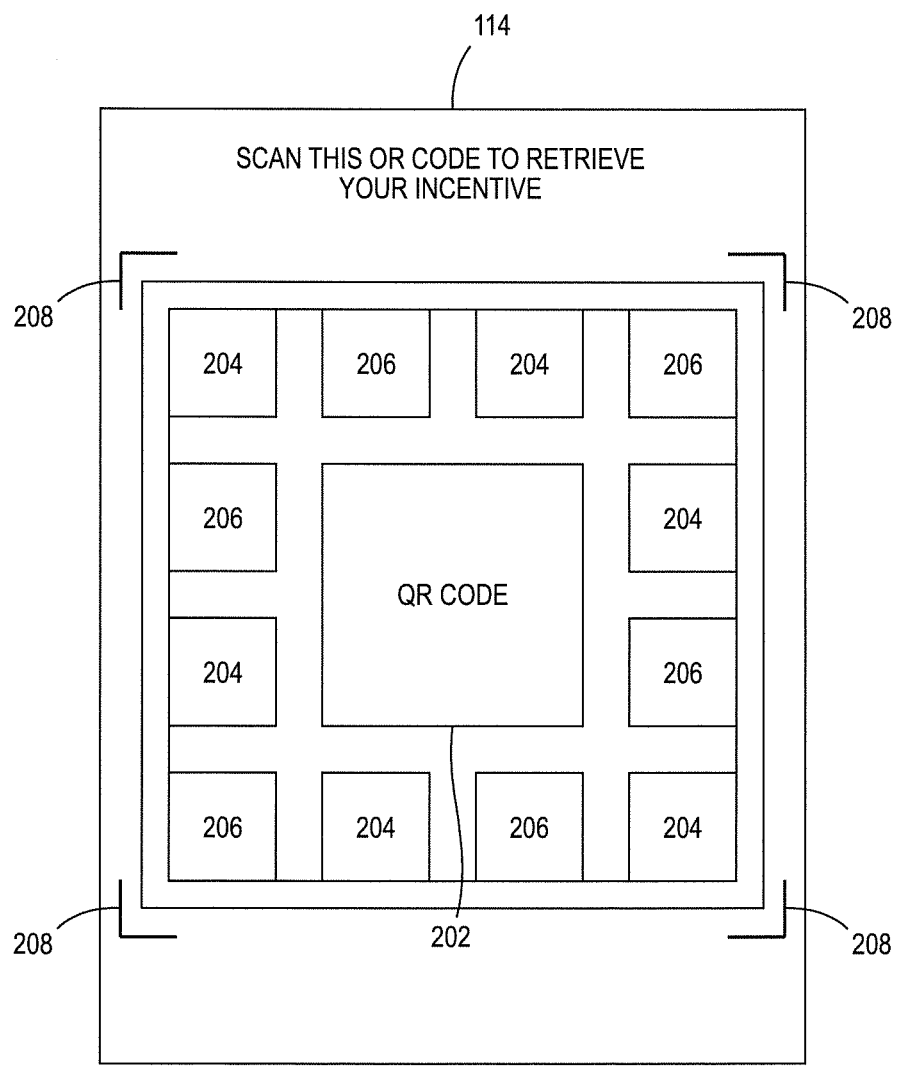
FIG. 2 illustrates an example apparatus of the present disclosure.

FIG. 2 illustrates an example of the color calibration card 114. In one embodiment, the color calibration card 114 includes a plurality of color patches 204 and 206. In one embodiment, the color patches 204 may be a first set of color patches with a known spectral reflectance for performing an overall color calibration. For example, color patches 204 may have known red, green and blue (RGB) spectral reflectances (e.g., a reflection of light at a particular wavelength). The color patches 204 may have a large difference in wavelengths to perform the overall color calibration. For example, one of the color patches 204 may have a known blue spectral reflectance at approximately 450 nanometers (nm), one of the color patches 204 may have a known yellow spectral reflectance at approximately 575 nm, one of the color patches 204 may have a known red spectral reflectance at approximately 700 nm, one of the color patches 204 may have a known white spectral reflectance, one of the color patches 204 may have a known black spectral reflectance, and so forth.

In one embodiment, the color patches 206 may be a second set of color patches with a known spectral reflectance for performing a fine tuning color calibration. For example, the color patches 206 may be a group of colors within a range for a particular skin tone. As noted above, the mobile skin care application 118 may be used to assess facial skin health of the customer 110 based on a selfie image. In one example, the customer 110 may be Caucasian. As a result, the color patches 206 may be a range of colors that are typically associated with a Caucasian person. Thus, FSAS 104 may perform a fine tuned calibration to accurate analyze a subsequently received selfie image for a Caucasian person.

In one embodiment, the color patches 206 may be different for different groups of people or ethnicities. For example, the color patches 206 may be different for an Asian person, for an African American person, and the like.

In one embodiment, the color patches 204 and 206 may be used to perform color calibration of images that are captured by the camera 112. Any method may be used to perform color calibration using the color calibration card 114 as is known in the art.

In one embodiment, the color calibration card 114 may also be used to identify the illuminant 116 that is being used for lighting. For example, the illuminant 116 may be determined based on a classification problem. A predetermined number of known illuminants may be identified and an RGB response profile may be generated for each one of the known illuminants for a particular color (e.g., a white colored patch) if the camera spectral response is known (e.g., if the manufacturer of the camera 112 is known, then the camera spectral response may be known). When an image of the color calibration card 114 is received, the RGB response profile for the particular color may be determined. The RGB response profile may then be compared to the known RGB response profiles of the predetermined number of known illuminants for a known camera. The RGB response profile of the predetermined number of known illuminants that matches the RGB response profile of the particular color from the image of the color calibration card 114 may be identified as the illuminant 116 that is being used by the customer 110.

However, if the spectral response of the camera 112 is not known, the reflectance spectrum of the skin of the customer 110 taking the selfie can still be determined. The reflectance spectrum of the skin of the customer 110 may be used for determining skin health. For example, the red response of the camera 112 may be determined by the product of the illuminant at a given wavelength, the skin reflectance at that wavelength, and the sensitivity of the red channel of the camera 112 at that wavelength, summed over all wavelengths at which the camera 112 has significant response. The same is true for the green and blue responses. Therefore, by knowing the red, green, and blue responses of the camera 112 for a number of different patches with different spectral reflectances, the product of the illuminant and the red, green and blue channel sensitivities of the camera 112 can be determined using standard techniques. This can be considered to be the spectral sensitivity of the illuminant/camera system. If the skin reflectance can be assumed to be determined by a small number of components of known spectral reflectance (for example hemoglobin and melanin), the amounts of these materials in the skin can be determined by finding the amounts that produce a spectral reflectance which when processed by illuminant/camera system with known spectral response, matches the red, green, and blue response observed from the camera. Examples of the functions described above and calculating the reflectance spectrum of the skin are described in co-pending U.S. Patent Provisional Application Ser. No. 62/311,175, entitled "METHOD AND APPARATUS FOR GENERATING GRAPHICAL CHROMOPHORE MAPS," filed on Mar. 21, 2016, which is incorporated by reference in its entirety.

In one embodiment, the color calibration card 114 may also include a quick response (QR) code 202. The QR code 202 may be located approximately in a center of the color calibration card 114 and surrounded by the color patches 204 and 206. In other words, the color patches 204 and 206 may be located around the QR code 202.

As noted above, the customer 110 may not be motivated to capture the image of the color calibration card 114 before transmitting a selfie image for analysis by the FSAS 104. However, to provide motivation for the customer to capture the image of the color calibration card 114 before transmitting a selfie image, the QR code 202 may provide an incentive to the customer.

In one embodiment, the incentive may be a coupon or a discount. The coupon or the discount may be a general coupon (e.g., 10% off your entire purchase) or a coupon for a particular product (e.g., 10% off skin care product X). For example, the coupon may be stored on the mobile endpoint device 108 and scanned from the mobile endpoint device 108.

In one embodiment, the incentive may be a tip or advice on how to use a product that has been purchased by the customer 110. For example, the color calibration card 114 may be packaged with a product and the QR code 202 may be a link to a website that provides the tip or the advice. In another embodiment, the link may be to a video or any other form of multimedia.

In one embodiment, the incentive may not be activated until the image of the color calibration card 114 is received by the FSAS 104. For example, the QR code 202 may be stored in a memory of the mobile endpoint device 108. However, when the customer 110 tries to activate the QR code 202, e.g., use the coupon or access a website, the coupon or the website may not work.

In one embodiment, after the FSAS 104 receives the image of the color calibration card, the FSAS 104 may transmit a key, an activation signal, and the like, to the mobile endpoint device 108. The key may be stored in the memory of the mobile endpoint device 108 with the QR code 202, thereby, activating the QR code 202. Thus, the coupon may be activated or the website may now allow access with the key received from the FSAS 104.

In one embodiment, the mobile skin care application 118 may not function until the image of the color calibration card 114 is received. For example, if the customer 110 attempts to capture a selfie image, the mobile skin care application 118 may not transmit the selfie image for analysis until the image of the color calibration card 114 is captured and transmitted to the FSAS 104.

For example, the mobile skin care application 118 may store a Boolean value in memory. The Boolean value may be initially set to "false." When the image of the color calibration card 114 is received by the FSAS 104, the FSAS 104 may transmit a signal to the mobile endpoint device 108 that transmitted the image of the color calibration card 114 that changes the Boolean value to "true." As a result, the mobile skin care application 118 may then operate normally to capture and transmit selfie images for facial skin health analysis.

In one embodiment, color calibration card 114 may include one or more alignment marks 208. The alignment marks 208 help the customer 110 to take a proper image of the color calibration card 114 that is a proper size and orientation. For example, one or more corresponding marks may be displayed on the mobile endpoint device 108. For example, the corresponding marks and the alignment marks 208 may have a same shape. The customer 110 may then position the camera 112 of the mobile endpoint device 108 such that the corresponding marks overlap the alignment marks 208.

In one embodiment, the alignment marks 208 may also ensure that the customer 110 is using enough light to capture the image of the color calibration card 114. For example, if the alignment marks 208 were not visible when the image of the calibration card 114 is captured, then the image may be too dark. The FSAS 104 may not be able to perform the color calibration based on the image if the image is too dark.

In one embodiment, the color calibration card 114 may be printed on any printing medium and may have a size of approximately a credit card (e.g., approximately 3⅜ inches by 2⅛ inches) or a business card (e.g., approximately 85 millimeters by 55 millimeters). As a result, the color calibration card 114 may be easily stored in a wallet of the customer 110.

As a result, the present disclosure provides a novel color calibration card 114 that includes a QR code 202 that is linked to incentives for the customer 110. As a result, the customer 110 may be motivated to consistently capture and transmit images of the color calibration card 114 before taking a selfie image.

In addition, the color calibration card 114 may include a second set of color patches that are for performing fine tuning color calibration for skin tone colors. The second set of color patches may be different for different people or ethnic groups of people. Thus, the color calibration performed by the FSAS 104 may be more accurate for each mobile endpoint device 108 and each selfie image captured by a customer 110.

Figure 3:
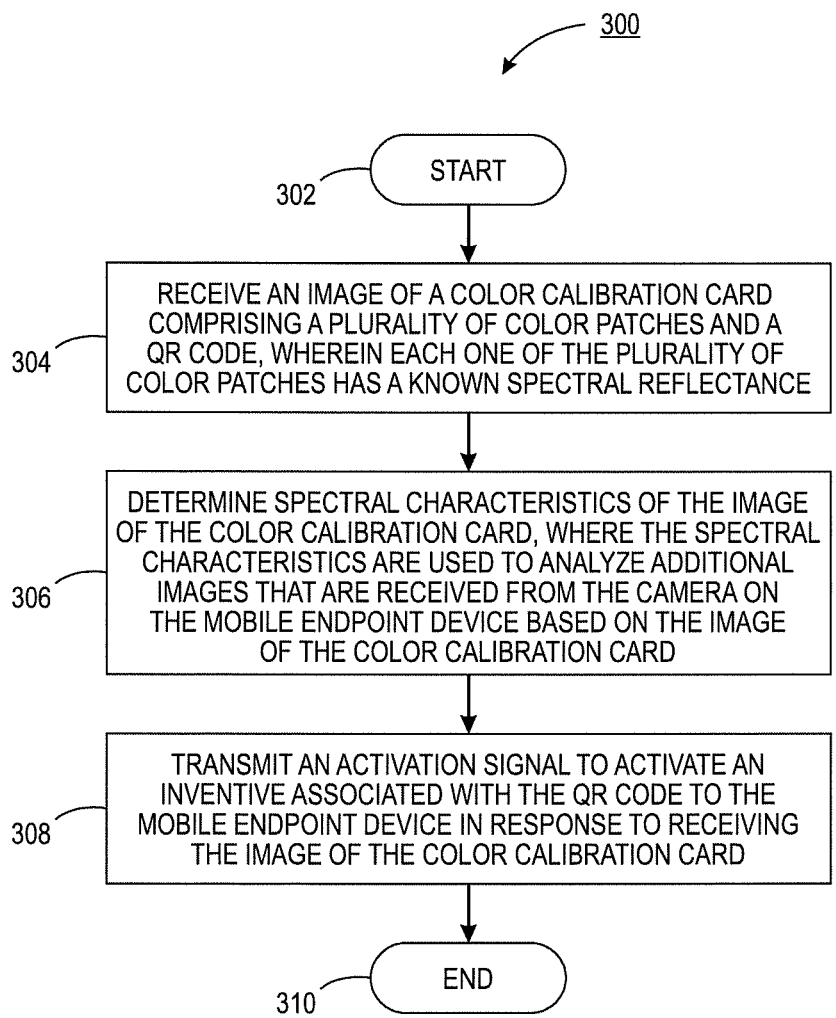
FIG. 3 illustrates a flowchart of an example method for determining spectral characteristics of an image captured by a camera on a mobile endpoint device.
Figure 5:
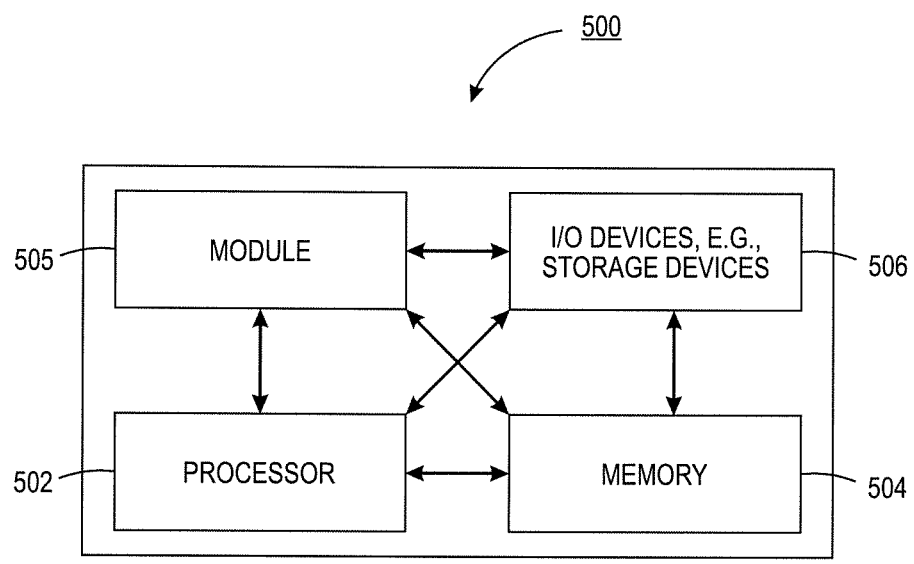
FIG. 5 illustrates a high-level block diagram of a computer suitable for use in performing the functions described herein.

FIG. 3 illustrates a flowchart of an example method 300 for determining spectral characteristics of an image captured by a camera on a mobile endpoint device. In one embodiment, one or more steps or operations of the method 300 may be performed by the FSAS 104 or a computer as illustrated in FIG. 5 and discussed below.

At block 302, the method 300 begins. At block 304, the method 300 receives an image of a color calibration card comprising a plurality of color patches and a quick response (QR) code, wherein each one of the plurality of color patches has a known spectral reflectance. An example of the color calibration card is illustrated in FIG. 2 and discussed above.

At block 306, the method 300 determines spectral characteristics from the image of the color calibration card, wherein the spectral characteristics are used to analyze additional images that are received from the camera on the mobile endpoint device based on the image of the color calibration card. For example, using the known reflection spectrum of hemoglobin and melanin, the concentration of the hemoglobin and melanin in an area of the skin can be determined.

In addition, the illuminant that was used to capture the image of the color calibration card may also be determined if the camera sensitivities of the camera being used are known. For example, the illuminant may be determined based on a classification problem. A predetermined number of known illuminants may be identified and an RGB response profile may be generated for each one of the known illuminants for a particular color (e.g., a white colored patch). When an image of the color calibration card is received, the RGB response profile for the particular color may be determined. The RGB response profile may then be compared to the known RGB response profiles of the predetermined number of known illuminants. The RGB response profile of the predetermined number of known illuminants that matches the RGB response profile of the particular color from the image of the color calibration card may be identified as the illuminant that is being used by the customer.

The spectral characteristics may then be used to provide a more accurate analysis of subsequent selfie images received from the customer taken with the same camera that captured the image of the color calibration card. By knowing the spectral characteristics (e.g., the illuminant, the camera sensitivities, and the like) a more accurate analysis may be performed on the received selfie images to assess facial skin health of the customer. The analysis of the selfie image may include generating one or more chromophore maps, determining a facial skin health assessment score, generating a facial skin interactive image, identify skin conditions, wrinkles, pores, and the like. Examples of different types of facial skin analysis that can be performed are described in co-pending U.S. Patent Provisional Application Ser. No. 62/311,192, entitled "METHOD AND SYSTEM FOR ASSESSING FACIAL SKIN HEALTH FROM A MOBILE SELFIE IMAGE," filed on Mar. 21, 2016, which is incorporated by reference in its entirety.

At block 308, the method 300 transmits an activation signal to activate an incentive associated with the QR code to the mobile endpoint device in response to receiving the image of the color calibration card. As discussed above, the color calibration card may include a QR code that is linked to incentives for the customer. The incentives may help motivate the customer to capture the image of the color calibration card before taking a selfie image that is sent to the FSAS for analysis.

In one embodiment, the incentives may be a coupon for purchases from the vendor. In another embodiment, the coupon may be for a specific product. In one embodiment, the incentives may be a tip or advice for a product that was purchased by the customer. For example, the QR code may provide a link to a website or some form of multimedia that is available online.

In one embodiment, when the user captures the image of the QR code, the incentive may be stored in the mobile endpoint device of the customer. However, the incentive may remain inactive until the activation signal is sent by the FSAS to the mobile endpoint device in response to receiving the image of the color calibration card. At block 310, the method 300 ends.

Figure 4:
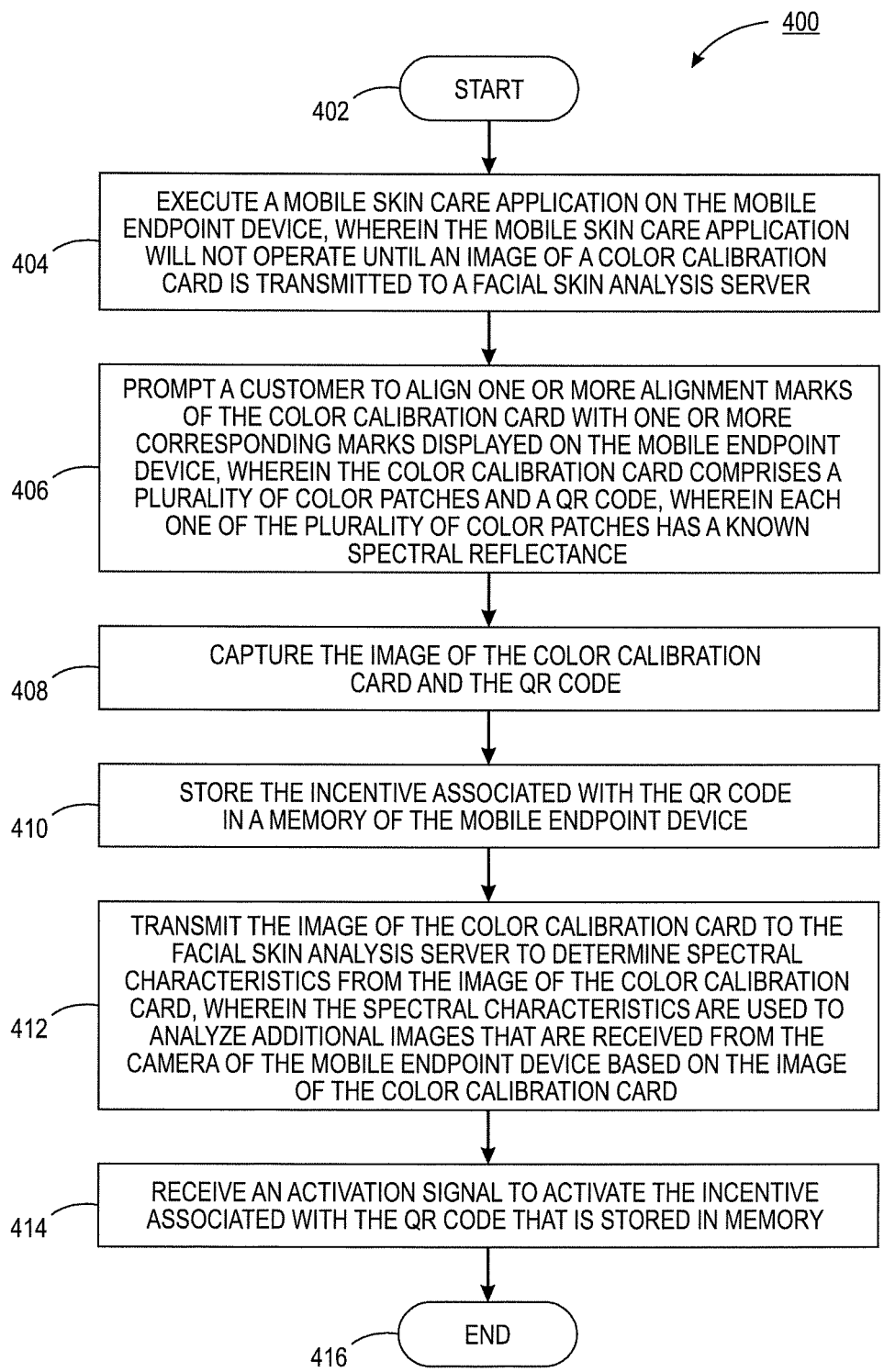
FIG. 4 illustrates a flowchart of another example method for determining spectral characteristics of an image captured by a camera on a mobile endpoint device.

FIG. 4 illustrates a flowchart of an example method 400 for determining spectral characteristics of an image captured by a camera on a mobile endpoint device. In one embodiment, one or more steps or operations of the method 400 may be performed by the mobile endpoint device 108 or a computer as illustrated in FIG. 5 and discussed below.

At block 402, the method 400 begins. At block 404, the method 400 executes a mobile skin care application on the mobile endpoint device, wherein the mobile skin care application will not operate until an image of a color calibration card is transmitted to a facial skin analysis server. For example, the mobile skin care application may open and ask for the customer to capture an image of the color calibration card before proceeding to a home screen with a full menu of functional features such as, capturing a selfie image, sending a selfie image to the FSAS for facial skin health analysis, and the like.

At block 406, the method 400 prompts a customer to align one or more alignment marks of the color calibration card with one or more corresponding marks displayed on the mobile endpoint device, wherein the color calibration card comprises a plurality of color patches and a quick response (QR) code, wherein each one of the plurality of color patches has a known spectral reflectance. For example, a display of the mobile endpoint device may show one or more corresponding alignment marks that can be placed over the one or more alignment marks of the color calibration card. The alignment marks may ensure that the image of the color calibration card that is captured is a proper size.

At block 408, the method 400 captures the image of the color calibration card and the QR code. For example, once the color calibration card is properly aligned, the image of the calibration card may be captured. The QR code on the calibration card may also be captured. For example, the mobile skin care application may include a QR code reader functionality that can read and decipher the QR code.

At block 410, the method 400 stores the incentive associated with the QR code in a memory of the mobile endpoint device. In one embodiment, the QR code may be read to obtain the inventive. The incentive may include a coupon code, a link to a website, or some other form of multimedia. The incentive may be stored in memory on the mobile endpoint device, but remain deactivated until an activation signal (e.g., a key, an activation code, a signal to change a Boolean value for the incentive, and the like) is received from the FSAS.

At block 412, the method 400 transmits the image of the color calibration card to the facial skin analysis server to determine spectral characteristics from the image of the color calibration card, wherein the spectral characteristics are used to analyze additional images received from the camera of the mobile endpoint device based on the image of the color calibration card. For example, using the known reflection spectrum of hemoglobin and melanin, the known reflection spectrum can determine the concentration of the hemoglobin and melanin in an area of skin. In addition, the image of the color calibration card may be used to determine an illuminant that is being used to capture the selfie images if the camera sensitivities are known.

At block 414, the method 400 receives an activation signal to activate the incentive associated with the QR code that is stored in memory. For example, in response to receiving the image of the color calibration card, the FSAS may send an activation signal to the mobile endpoint device. The activation signal may enable the incentive that was previously stored in memory on the mobile endpoint device to be activated. For example, the coupon may work when scanned, the website may allow access to the customer, the multimedia file may play, and the like. At block 416, the method 400 ends.

It should be noted that although not explicitly specified, one or more steps, functions, or operations of the methods 300 and 400 described above may include a storing, displaying and/or outputting step as required for a particular application. In other words, any data, records, fields, and/or intermediate results discussed in the methods can be stored, displayed, and/or outputted to another device as required for a particular application.

FIG. 5 depicts a high-level block diagram of a computer that can be transformed into a machine that is dedicated to perform the functions described herein. As a result, the embodiments of the present disclosure improve the operation and functioning of the computer to improve methods for determining spectral characteristics of an image captured by a camera on a mobile endpoint device, as disclosed herein.

As depicted in FIG. 5, the computer 500 comprises one or more hardware processor elements 502 (e.g., a central processing unit (CPU), a microprocessor, or a multi-core processor), a memory 504, e.g., random access memory (RAM) and/or read only memory (ROM), a module 505 for determining spectral characteristics of an image captured by a camera on a mobile endpoint device, and various input/output devices 506 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computer may employ a plurality of processor elements. Furthermore, although only one computer is shown in the figure, if the method(s) as discussed above is implemented in a distributed or parallel manner for a particular illustrative example, i.e., the steps of the above method(s) or the entire method(s) are implemented across multiple or parallel computers, then the computer of this figure is intended to represent each of those multiple computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computer or any other hardware equivalents, e.g., computer readable instructions pertaining to the method(s) discussed above can be used to configure a hardware processor to perform the steps, functions and/or operations of the above disclosed methods. In one embodiment, instructions and data for the present module or process 505 for determining spectral characteristics of an image captured by a camera on a mobile endpoint device (e.g., a software program comprising computer-executable instructions) can be loaded into memory 504 and executed by hardware processor element 502 to implement the steps, functions or operations as discussed above in connection with the exemplary methods 300 and 400. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 505 for determining spectral characteristics of an image captured by a camera on a mobile endpoint device (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for determining spectral characteristics of an image captured by a camera on a mobile endpoint device, comprising:

receiving, by a processor, the image of a color calibration card comprising a plurality of color patches and a quick response (QR) code, wherein each one of the plurality of color patches has a known spectral reflectance;

determining, by the processor, the spectral characteristics from the image of the color calibration card, wherein the spectral characteristics are used to analyze additional images that are received from the camera on the mobile endpoint device; and transmitting, by the processor, an activation signal to the mobile endpoint device that changes a Boolean value stored in a memory of the mobile endpoint device from a value of false to a value of true to allow operation of a mobile skin care application executed on the mobile endpoint device and to activate an incentive associated with the QR code to the mobile endpoint device in response to receiving the image of the color calibration card.

2. The method of claim 1, wherein the plurality of color patches comprise a first set of color patches for an overall color calibration and a second set of color patches for a fine tuning color calibration.

3. The method of claim 2, wherein the second set of color patches comprise a range of colors associated with skin colors.

4. The method of claim 3, wherein the second set of color patches are different for different types of people.

5. The method of claim 1, wherein the incentive comprises a discount for a future purchase that is stored on the mobile endpoint device.

6. The method of claim 1, wherein the incentive comprises a link to a webpage that provides a tip on using a product that was purchased with the color calibration card.

7. The method of claim 1, wherein the image is taken via a mobile skin care application on the mobile endpoint device.

8. The method of claim 1, wherein the spectral characteristics comprise an illuminant used for the image and a camera spectral sensitivity.

9. The method of claim 1, further comprising:
receiving, by the processor, a subsequent image of a customer associated with the mobile endpoint device;
analyzing, by the processor, the subsequent image using the spectral characteristics determined from the image of the color calibration card; and
analyzing, by the processor, the subsequent image to determine a facial skin health of the customer.

10. A color calibration card for determining spectral characteristics of an image captured by a camera on a mobile endpoint device, comprising:
a plurality of color patches, wherein each one of the plurality of color patches has a known spectral reflectance, wherein the plurality of color patches comprise a first set of colors for an overall color calibration and a second set of colors for a fine tuning color calibration, wherein the second set of color patches comprise a range of colors associated with skin colors;
a quick response code comprising a link to an incentive that is activated after an image of the color calibration card is received by a facial skin analysis server; and
one or more alignment marks.

11. The color calibration card of claim 10, wherein the second set of color patches are different for different types of people.

12. The color calibration card of claim 10, wherein the incentive comprises a discount for a future purchase that is stored on the mobile endpoint device.

13. The color calibration card of claim 10, wherein the incentive comprises a link to a webpage that provides a tip on using a product that was purchased with the color calibration card.

14. The color calibration card of claim 10, comprising a white backing with a known response.

15. The color calibration card of claim 10, wherein the one or more alignment marks align with corresponding marks that are displayed on a mobile endpoint device of a customer.

16. The color calibration card of claim 10, wherein the plurality of color patches are located around the QR code.

17. A method for determining spectral characteristics of an image captured by a camera on a mobile endpoint device, comprising:
executing, by a processor, a mobile skin care application on the mobile endpoint device, wherein the mobile skin care application will not operate until the image of a color calibration card is transmitted to a facial skin analysis server;
prompting, by the processor, a customer to align one or more alignment marks of the color calibration card with one or more corresponding marks displayed on the mobile endpoint device, wherein the color calibration card comprises a plurality of color patches and a quick response (QR) code, wherein each one of the plurality of color patches has a known spectral reflectance;
capturing, by the processor, the image of the color calibration card and the QR code;
storing, by the processor, an incentive associated with the QR code in a memory of the mobile endpoint device;
transmitting, by the processor, the image of the color calibration card to the facial skin analysis server to determine spectral characteristics from the image of the color calibration card, wherein the spectral characteristics are used to analyze additional images that are received from the camera of the mobile endpoint device; and
receiving, by the processor, an activation signal from the facial skin analysis server that changes a Boolean value stored in a memory of the mobile endpoint device from a value of false to a value of true to allow operation of the mobile skin care application and to activate the incentive associated with the QR code that is stored in memory.

* * * * *